US011951336B2

(12) United States Patent
Franko

(10) Patent No.: US 11,951,336 B2
(45) Date of Patent: Apr. 9, 2024

(54) FLAME RESISTANT PROTECTIVE SUPPORT BRA

(71) Applicant: Kelly Franko, Cortland, OH (US)

(72) Inventor: Kelly Franko, Cortland, OH (US)

( * ) Notice: Subject to any disclaimer, the term of this patent is extended or adjusted under 35 U.S.C. 154(b) by 209 days.

(21) Appl. No.: 17/588,781

(22) Filed: Jan. 31, 2022

(65) Prior Publication Data

US 2023/0241425 A1 Aug. 3, 2023

(51) Int. Cl.
*A62B 17/00* (2006.01)
*A41C 3/00* (2006.01)
*A41C 3/12* (2006.01)

(52) U.S. Cl.
CPC .......... *A62B 17/003* (2013.01); *A41C 3/0028* (2013.01); *A41C 3/12* (2013.01)

(58) Field of Classification Search
CPC ........ A41C 3/0028; A41C 3/12; A42B 17/003
See application file for complete search history.

(56) References Cited

U.S. PATENT DOCUMENTS

| | | | | |
|---|---|---|---|---|
| 2004/0127133 A1* | 7/2004 | Chuang | ................. | D06M 17/00 442/381 |
| 2008/0214076 A1* | 9/2008 | Harris | ...................... | D04B 1/16 442/136 |

* cited by examiner

*Primary Examiner* — Gloria M Hale
(74) *Attorney, Agent, or Firm* — Harpman & Harpman

(57) ABSTRACT

A comfortable size adaptable bra that provides work and sports related protection from the risk of arc flash, flash fire, combustible dust or molten splash during job or sports performance. The bra utilizes non-flammable high performance materials that combines flexible, soft to the touch material with non-flammable properties for a comfortable self-supporting job safe bra by an enhanced fabrication process.

6 Claims, 4 Drawing Sheets

FLAME RESISTANT PROTECTIVE SUPPORT BRA

BACKGROUND OF THE INVENTION

1. Technical Field

This invention relates to women's support garments, specifically bras and non-flammable flame resistant protection apparel that will provide an inner layer of protection to the wearer.

2. Description of Prior Art

Prior art non-flammable protective apparel has heretofore been limited to generally outerwear such as Nomex driver's suits and flame and heat resistant jackets, gloves, face masks and helmets. While sports bras have been developed to support a woman's breast during vigorous activity and safety undergarments designed specifically for women to protect their anatomy from flame and heat conditions that may be incurred on the job venues are currently available. Prior art women's bras made from high performance flame resistant comfortable fabrics which are now currently available and meet performance standards in the industry provide limited support without individual support cups.

SUMMARY OF THE INVENTION

A fire-resistant women's undergarment bra that provides a safe, comfortable support garment that utilizes advances in fire resistant materials and construction methodology. The bra uses a combination of support inducing seams and construction techniques for bra fabrication method that introduces a self-supporting job safe bra that is comfortable for wear for extended period of times while providing protection from a variety of fire risks including flash fire, arc flash, combustible dust and molten material splash during job and sports performance.

DETAILED DESCRIPTION OF THE INVENTION

Figure 1:
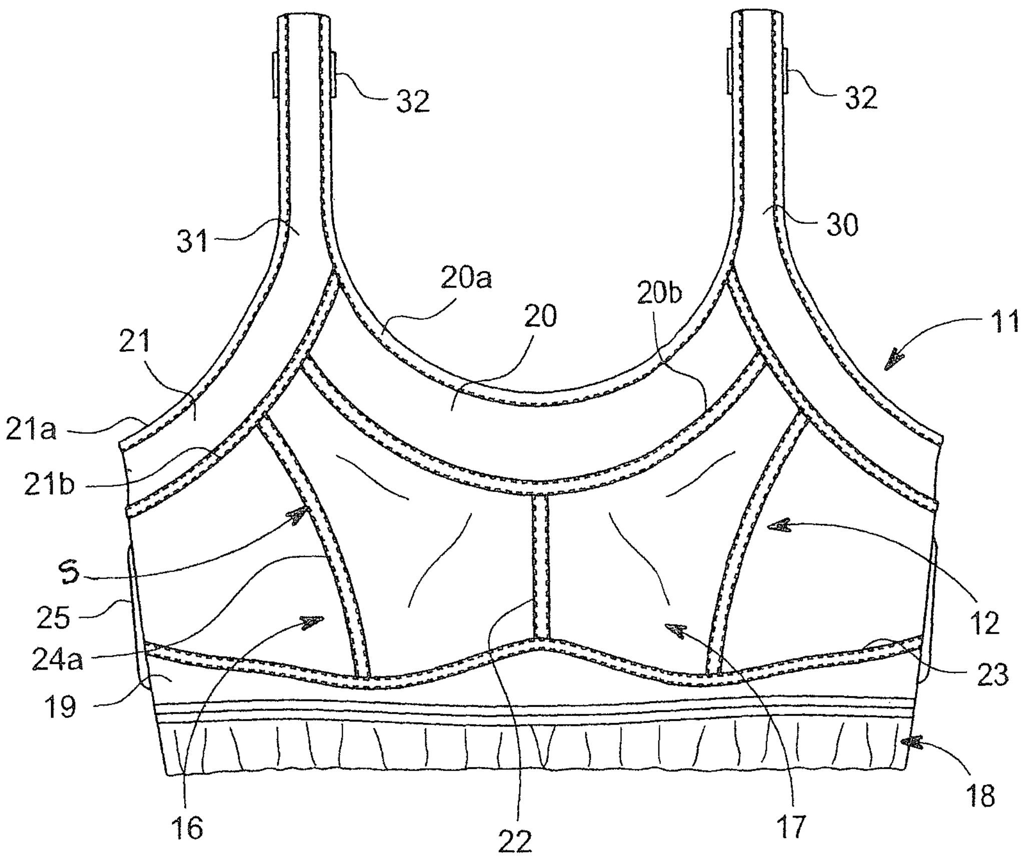
FIG. 1 is a front elevational view of the safety bra of the invention.
Figure 2:
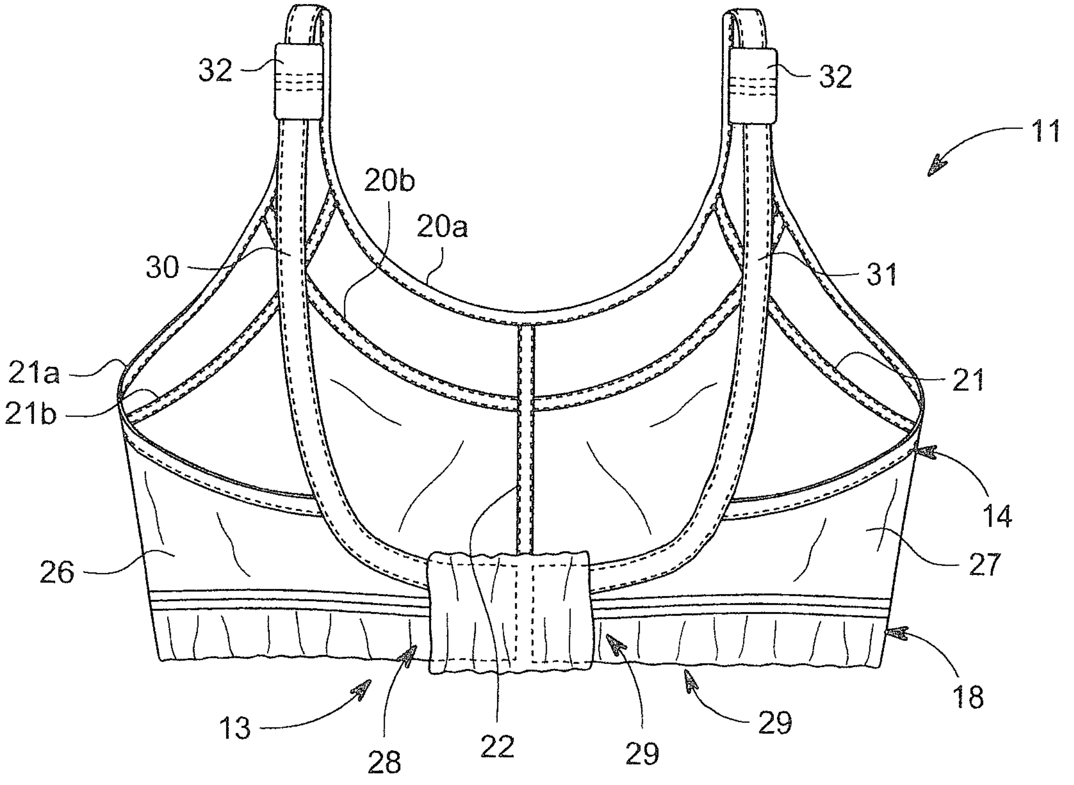
FIG. 2 is a rear elevational view thereof.

Referring to FIGS. 1 and 2 of the drawings, a flame and heat resistant women's work and sports bra 10 of the invention can be seen constructed of specific flame-resistant materials. The construction of the bra 10 utilizes fabrics such as Carbon X brand characterized as a lightweight fabric in multiple layers that provides protection from a multiple fire induced event while providing a breathable and superior moisture management. Fabric examples can be seen additionally as Carbon X Active no-melt, no-drip active base layer fabric rated NFPA 70E hazard, risk category 2 (outerwear) for protective properties as a truly non-flammable designation.

The bra 10 has a main fabric body member 11 configured to be formed around a human torso, not shown, with a front defined individual breast engagement areas 12 and a rear closure strap support defined area 13 interconnected by opposing contoured yielding seamed fabric side panel portions 14 and 15.

The front breast engagement area 12 has a pair of breasts receiving cups 16 and 17 therein. Each of the breast receiving cups 16 and 17 are formed of seamless flame and heat resistant fabric layers and are positionally defined by compound attachment and integrated support seams S of fire retardant thread with a descending attached torso encompassing base banding 18 with transitional undercut panels 19 attached to the respective cups 16 and 17 by taping elastic secured by traditional zig zag lock stitch known in the art.

The cups 16 and 17 configuration are defined by front, neck and arm hole transition fabric strips 20 and 21 respectively thereby on their corresponding upper perimeter edges of the bra construction as will be seen best in FIGS. 1 and 2 of the drawings.

The neck and arm hole transition fabric strips 20 and 21 respectively are configured by corresponding seams 20A, 20B and 21A, 21B. The breast receiving cups 16 and 17 are therefore defined by the support seams 20B and 21B and a central depending support seam 22 there between. Transition undercut panel 19 is correspondingly defined by a contoured horizontal support seam 23 and a base banding seam 18A.

A pair of individual curved translateral breast cup support seams 24A and 24B extend from respective support seams 21B to support seam 23 over each breast cup 16 and 17. It will therefore be evident from the above description that the combination of the breast cup support seams provide a self-supporting breast enclosure while conforming to flame and heat resistance material structural requirements within the industry.

The attached base banding 18 utilizes an elastic component of high performance Otex's Sentry FR no-melt, no-drip elastic stitched around the bottom keeping the bra 10 stable on the user's ribcage, not shown, during activity thus preventing lifting and rolling of the elastic enabled banding 18 and thereby prevent breast tissue from being dislodged during use.

It will be evident that the width of the elastic enabled banding 18 will thereby be proportional depending on the relative bra's breast cup size utilized. The defined orientation of bra construction support seams works to keep the user's breast, not shown, forward and lifted within the garment so it does not slide down under the arm while respective vertical side seams 25 placed under the respective arms create additional bi-directional support to resist breast migration under the arm which may occur. The so defined vertical side seams 25 are attached to the side fabric panels 14 and 15 imparting strength thereto which is not achievable by a single seamless traditional side panel. The elastic is stitched along the top of the back band 18 up to the hook and eye closure for added structure and fit.

Figure 3:
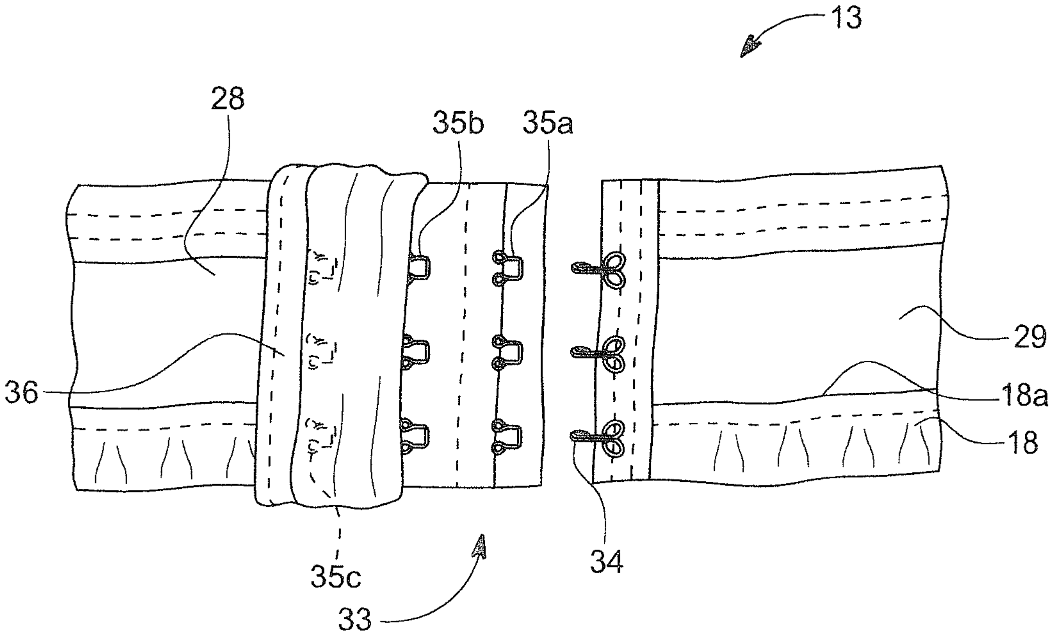
FIG. 3 is an enlarged partial rear elevational view of the bra closure in open position with pocket portion folded back.
Figure 4:
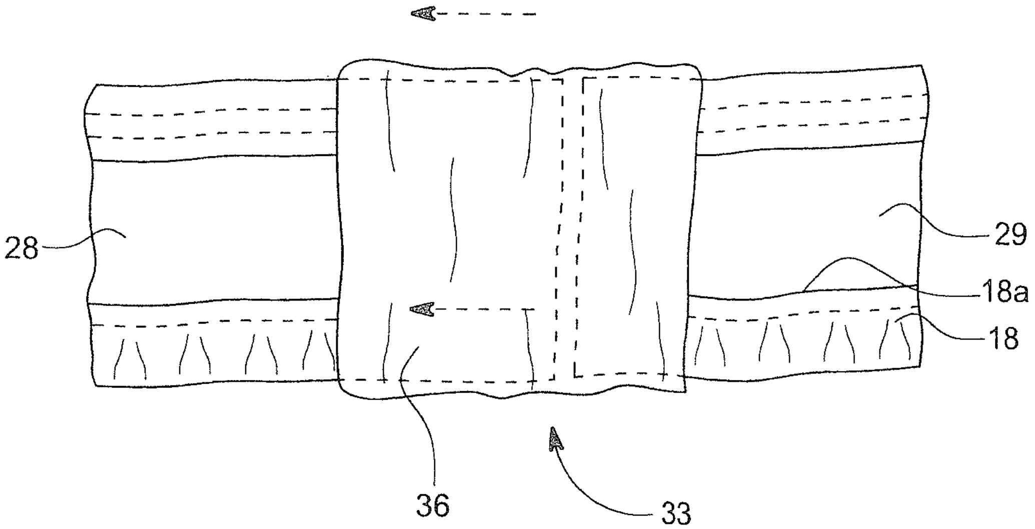
FIG. 4 is an enlarged partial rear elevational view of the bra closure in closed protected pocket position.

Referring now to FIGS. 2, 3 and 4 of the drawings, the rear closure strap support defining area 13 has opposing and abutting flexible flame-resistant fabric strap back panels 26 and 27 that extend respectively from the side seams 25 and transitional seamed panels 14 and 15 having the torso fitting elastic enabled banding 18 extending along their respective base. The fabric strap back panels 26 and 27 provide and define oppositely disposed back extending perimeter bra straps 28 and 29 extensions which are selectively secured in end-to-end relationship with cover stitch lap seams which have the respective shoulder straps 30 and 31 extending to the hereinbefore described front defined breast engagement area 12 as is typical in any bra configuration.

The bra straps construction has minimal stretch so that the straps do not "carry" the weight of the breast but rather lift to the set point, halfway between the shoulder and the elbow, not shown, for maximum airflow under the breast tissue. Air flow allows for the flame-resistant fabric to work appropriately by wicking moisture away from the body and to the outside of the garment where it can evaporate rather than collecting under the breast tissue. Elastic 30A and 31A in strap construction is used only in the back of the straps where the adjustment in length of the strap occurs.

Each of the straps 30 and 31 have, in this instance, length adjustment paired flame rated plastic strap fittings 32 positioned in longitudinally spaced relation to one another with an FR rated NFPA 2112, 70E plastic slider manufactured by American Cord and Webbing. It will be evident that all of the threads used for the bra construction in this application are of the Nomex brand retardant which has a known decomposition property which occurs at approximately 700 Fahrenheit being compliant with such flame-resistant garment construction within the industry.

Figure 5:
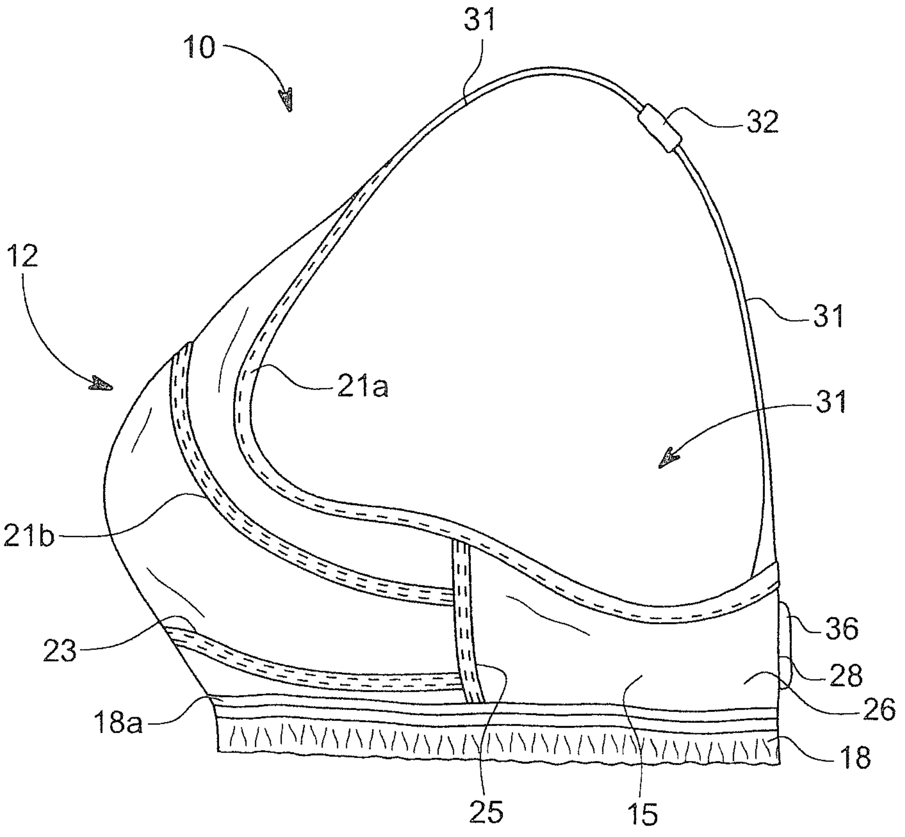
FIG. 5 is a side elevational view of the safety bra of the invention.

Referring now to FIGS. 4 and 5 of the drawings, adjustable bra closure fastener assembly 33 can be seen having multiple spaced hooks 34 secured in this application to the free end of the back strap 29 in vertically aligned spaced orientation. A plurality of correspondingly aligned vertical and spaced closure engagement multiple loop assemblies 35A, 35B and 35C are secured in a traditional manner to and extend from the opposite back strap 28. It will be evident therefore that the hooks 34 can be selectively engaged on the corresponding loop assemblies 35A, 35B and 35C as needed for length adjustability as will be well understood by those skilled in the art.

In this application, a fire-resistant fabric pocket panel 36 of hereinbefore described high tech performance carbon active material is formed over the loop assemblies 35A, 35B and 35C to provide a flame and heat protection to the engaged metal hooks 34 and loop portion assemblies when selectively secured to one another during use. It will be seen that the orientation of the fabric pocket 36 will protect the so engaged metal closure elements of the bra yet allowing traditional access for attachment and removal during use. Again, such fabric pocket cover elements are attached at one end by the utilization of fire resistant Nomex brand threads and associated garment construction stitching patterns known in the industry. The technical orientation and construction of the bra 10 of the invention utilizing the unique fire-resistant materials hereinbefore described impart, as noted, a variety of improved wearing comfort and support characteristics with the mediation of trapped moisture heretofore would cause skin irritation.

The vertical side seams 25 strengthen as well as noted adjoining the two panel sections of fabric together provides vertical side shape support.

Referring back to the front defined breast engagement area 12 and the respective breast engagement cups 16 and 17, a center seam 22 separated the respective cups which encapsulate each breast, not shown. This design feature with the perimeter support seams 20A and 20B and 21A and 21B and translateral seams 24A and 24B, as noted, keeps the breast tissue from spilling inwardly creating moisture buildup and friction. The added support seam section stitch 18A between the base of the cups and the band elastic 18 provides further support and lift as well as seam support from the center seam unique in a shape support defined fire-resistant bra.

The bra's construction utilizes both seams stitched with a straight stitch utilizing the Nomex thread to obtain a fire-resistant durable result and the zig zag stitching along the neckline straps and under the arms to create expandable areas as well, and center perimeter cup support seams will not tear the thread when stretched, this creates a more comfortable fit for the wearer.

It will thus be seen that a new and novel women's undergarment safety support bra having high levels of fabric induced fire and flame resistant has been illustrated and described. The bra 10 provides for an ideal solution for professionals performing high activity tasks in fire induced risk environments.

The new and novel fire-resistant support bra has been illustrated and described and it will be apparent to those skilled in the art that various changes and modifications may be made therein without departing from the spirit of the invention.

Therefore I claim:

1. A fire and flame resistant brassiere for comfortable support and protection of the breast area from excessive heat and movement comprising, a fabric body member having front defined individual breast engagement areas, oppositely disposed side support panels and integrated extending rear closure straps, said breast engagement areas defining independent breast receiving cups of seamless flame and heat retardant material, pair of spaced parallel contoured upper support seams on each breast receiving cup, a contoured horizontal seam defining transition undercut panels having an attached depending elastic base band with high performance no melt, no drip elastic stitching, a center depending support seam between said breast engagement areas, adjustable shoulder support straps extending integrally from said spaced parallel contoured support seams on each breast receiving cup.

2. The fire and flame resistant brassiere of claim 1 wherein said fabric body member fire- and flame-resistant material is of, lightweight fabric layers.

3. The fire and flame resistant brassiere of claim 1 wherein said breast receiving cup support seams further comprise, contoured translateral extending support seams extending from one of said spaced parallel contoured support seam to said horizontal seam defining said transition undercut panels.

4. The fire and resistant brassiere of claim 1 wherein said side support panels have respective vertical side seams for transitional vertical panel support.

5. The fire and flame resistant brassiere of claim 1 wherein one of said closure straps have a fire-resistant fabric pocket secured thereto for selective deployment over corresponding hook and loop closure assemblies on said respective rear closure straps.

6. The fire and flame resistant brassiere of claim 1 wherein said adjustable shoulder straps have fire rated plastic length adjustable fittings.

* * * * *